(12) United States Patent
Hollis

(10) Patent No.: US 8,572,001 B2
(45) Date of Patent: Oct. 29, 2013

(54) SIMULTANEOUS VEHICLE ROUTING, VEHICLE SCHEDULING, AND CREW SCHEDULING

(75) Inventor: Benjamin Leslie Hollis, Oxley (AU)

(73) Assignee: The Boeing Company, Chicago, IL (US)

(*) Notice: Subject to any disclaimer, the term of this patent is extended or adjusted under 35 U.S.C. 154(b) by 1151 days.

(21) Appl. No.: 12/099,327

(22) Filed: Apr. 8, 2008

(65) Prior Publication Data

US 2009/0254405 A1 Oct. 8, 2009

(51) Int. Cl.
G06Q 30/00 (2012.01)
G06Q 10/00 (2012.01)

(52) U.S. Cl.
USPC ............... 705/337; 705/7.25; 705/330

(58) Field of Classification Search
USPC .................... 705/7.25, 330, 337
See application file for complete search history.

(56) References Cited

U.S. PATENT DOCUMENTS

| | | | |
|---|---|---|---|
| 5,880,958 A * | 3/1999 | Helms et al. | 701/117 |
| 7,765,120 B2 * | 7/2010 | Yadappanavar et al. | 705/7.22 |
| 2007/0282618 A1 * | 12/2007 | Barahona et al. | 705/1 |
| 2008/0140597 A1 * | 6/2008 | Satir et al. | 706/46 |

FOREIGN PATENT DOCUMENTS

WO 2004097341 A1 11/2004

OTHER PUBLICATIONS

Barnhart, Cynthia; Cohn, Amy. Airline Schedule Planning: Accomplishments and Opportunities. Manufacturing & Service Operations Management. v6n1 pp. 3-22. Winter 2004 (Retrieved via Dialog Quicksearch on Sep. 20, 2011).*
Hollis et al., "Discrete Optimization Vehicle routing and crew scheduling for metropolitan mail distribution at Australia Post", European Journal of Operational Research 173 (2006), pp. 133-150.
Hollis et al., "Simultaneous Vehicle and Crew Scheduling with Time Windows for the Product Delivery Problem", Oct. 5, 2007, pp. 1-23.
European Search Report, Jul. 10, 2009, pp. 1-8.

* cited by examiner

*Primary Examiner* — Scott Zare
(74) *Attorney, Agent, or Firm* — Yee & Associates, P.C.

(57) ABSTRACT

A method for generating a transportation plan. A set of transportation requests are identified. An initial transportation plan having a set of vehicle routes, a set of vehicle schedules, and a set of crew schedules that satisfy the set of transportation requests is created. A set of vehicle routes, a set of vehicle schedules, and a set of crew schedules are simultaneously modified repeatedly using a policy to generate a new transportation plan until an objective is met.

17 Claims, 8 Drawing Sheets

FIG. 6
```
Let M = ENUM
Let PrevImprov = 100%
ImplementDPAAlterations()
do
    if PrevImprov ≤ 0.5%
        if AllDPAAlterationsRemoved() = true
            if PerformFixing(M) = false
                break
        RemoveNextDPAAIteration()
    if AllDPAAlterationsRemoved() = false
        Repeat(M = M∪RGE(), M)
        Repeat(M = M∪BFBOE(), M)
    Repeat(M = M∪CDPA(), M)
    M = M ∪ EVS()
    M = M ∪ LCI()
    PrevImprov = SolveLP(M)
    PrunePool(M)
while(true)
```

600

FIG. 7
```
Let M = ∅
forall s in S                        // All shipments
    Let c = LeastCostSingleShipmentSchedule(s)
    do
        Let X = T(c)                 // Include the existing tasks in c
        forall u in S(c)             // All shipments compatible with c
            forall r in R(c)         // All routes in c
                forall v in V        // All vehicle types
                    X = X∪CreateNewTasksByLeastCostInsertion(u, r, v, c)
        Let N = DPA(X)               // Generate new schedules
        c = LRC(N, c)                // Update seed schedule
        M = M∪NRC(N)                 // Store negative reduced cost schedules
    while (c ≠ Null)
return M
```

```
Let M = ∅                          // Initialize the set of schedules generated
forall v in V                      // All vehicle types
    forall c in C(v)               // For schedules contributing to the peak
        Let X = T(c)               // Include the existing tasks in c
        forall t in T(c)           // All tasks in the schedule
            forall w in V where v ≠ w
                X = X ∪ VehSub(t, w, c)
        M = M ∪ NRC(DPA(X))        // Generate negative reduced cost schedules
return M
```

```
Let M = ∅                          // Initialize the set of schedules generated
forall c in SeedSet                // For schedules in the seed set
    Let X = T(c)                   // Include the existing tasks in c
    forall v in V                  // All vehicle types
        forall t in T(c)           // All tasks in c
            if v ≠ V(t)
                X = X ∪ VehSub(t, v, c)    // Make new tasks by vehicle sub.
    forall r in R(c)               // All routes in c
        forall s in S(c)           // All compatible shipments
            X = X ∪ CreateNewTasksByCostInsertions(s, r, v, c)
    M = M ∪ NRC(DPA(X))            // Generate new schedules
return M
```

900

SIMULTANEOUS VEHICLE ROUTING, VEHICLE SCHEDULING, AND CREW SCHEDULING

BACKGROUND INFORMATION

1. Field

The present disclosure relates generally to transportation systems and in particular to a method and apparatus for managing a transportation system. Still more particularly, the present disclosure relates to a computer implemented method, apparatus, and computer usable program code for simultaneously generating vehicle routing, vehicle scheduling, and crew scheduling for a transportation system.

2. Background

Transportation systems are used to move people and/or goods from one place to another. Transportation systems also may be referred to as transportation networks. A transportation system may include an infrastructure. This infrastructure may include transport networks and nodes. A transportation network may be, for example, roads, railroads, airways, waterways, canals, and other suitable mediums for moving vehicles from one location to another location. Nodes include, for example, airports, railway stations, trucking stations, seaports, and other suitable locations. Some of these nodes are also referred to as depots. A depot is a node where vehicles and drivers are based. Depots are the starting and ending nodes for vehicle and crew schedules.

Vehicles are used to transport items, such as goods and/or people, between nodes. These items may be transported on vehicles, such as, for example, trucks, automobiles, buses, trains, and aircraft.

Operations deal with the manner in which vehicles are operated in a transportation network. The operations may be constrained by the infrastructure. Further, a set of rules or policies may determine what operations may be legally performed within a transport system. These rules include, for example, laws, codes, regulations, agreements, licenses, and other suitable rules.

In managing the transportation of items to different locations, one or more objectives may be present. One objective includes the cost to transport all the items.

Vehicle routing, vehicle scheduling, and crew scheduling are some of the problems often faced by planners of transportation systems. Examples of such transportation systems include: metropolitan mail delivery; intra-state parcel delivery; distribution of consumer goods from warehouses to retail outlets; and transportation of cargo and passengers by aircraft in theatres of war. The challenges faced by these and other types of transportation systems involves finding a minimum cost for a set of mutually compatible vehicle routes, vehicle and crew schedules to transport a set of specific transportation requests. Examples of transportation requests include: picking up and dropping off passengers at different locations; transporting cargo between specific origins and destinations; picking up and delivering mail and parcels between mail sorting and processing facilities.

Numerous solutions and programs are currently available to generate a plan for transporting items within a transport system. Some solutions first construct a set of vehicle routes. After the set of vehicle routes are constructed, a set of crew schedules are built to cover the vehicle routes. Further, vehicles are assigned to the set of vehicle routes to produce vehicle schedules.

These techniques may use various algorithms or processes. For example, algorithms using various meta-heuristic techniques like tabu search and algorithms based on linear and integer programming theory may be employed to generate a plan for transporting items within a transportation system. Although these different processes provide plans for transporting items, these different processes do not always provide the most desirable or least cost transportation plans. Therefore, it would be advantageous to have an approved method and apparatus that overcomes the above described problems.

SUMMARY

One advantageous embodiment provides a method for generating a transportation plan. A set of transportation requests are identified. An initial transportation plan having a set of vehicle routes, a set of vehicle schedules, and a set of crew schedules that satisfy the set of transportation requests is created. The set of vehicle routes, the set of vehicle schedules, and the set of crew schedules are simultaneously modified repeatedly using a policy to generate a new transportation plan until an objective is met.

In another advantageous embodiment, a computer implemented method is present for creating a transportation plan. Data relating to vehicle routing, vehicle scheduling, and crew scheduling is identified to form input data. A set of vehicle routes, a set of vehicle schedules, and a set of crew schedules are simultaneously identified using the input data.

In yet another advantageous embodiment, a data processing system comprises a bus, a communication unit, a storage device, and a processor unit. The storage device includes computer usable program code. The processor unit executes the computer usable program code to identify a set of transportation requests. An initial transportation plan is created having a set of vehicle routes, a set of vehicle schedules, and a set of crew schedules that satisfy the set of transportation requests. The set of vehicle routes, the set of vehicle schedules, and the set of crew schedules are simultaneously modified repeatedly using a policy to generate a new transportation plan until an objective is met.

In yet another advantageous embodiment, a computer program product is present for generating a transportation plan. The computer program product comprises program code stored on a computer readable medium. Program code is present on the computer readable medium for identifying a set of transportation requests. Program code is present on the computer readable medium for creating an initial transportation plan having a set of vehicle routes, a set of vehicle schedules, and a set of crew schedules that satisfy the set of transportation requests. Program code is also present on the computer readable medium for simultaneously modifying the set of vehicle routes, the set of vehicle schedules, and the set of crew schedules repeatedly using a policy to generate a new transportation plan until an objective is met.

In a further advantageous embodiment, a data processing system comprises a bus, a communication unit, a storage device, and a processor unit. The storage device includes program code. The processor unit executes the program to identify data relating to vehicle routing, vehicle scheduling, and crew scheduling to form input data. The set of vehicle routes, the set of vehicle schedules, and the set of crew schedules are simultaneously identified using the input data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is a diagram illustrating code for generating a transportation plan in accordance with an advantageous embodiment;

FIG. 7 is a diagram of code for breadth first best only enumeration in accordance with an advantageous embodiment;

FIG. 8 is a diagram illustrating code for explicit vehicle substitution in accordance with an advantageous embodiment; and FIG. 9 is a diagram of code for least cost insertion in accordance with an advantageous embodiment;

DETAILED DESCRIPTION

Figure 1:
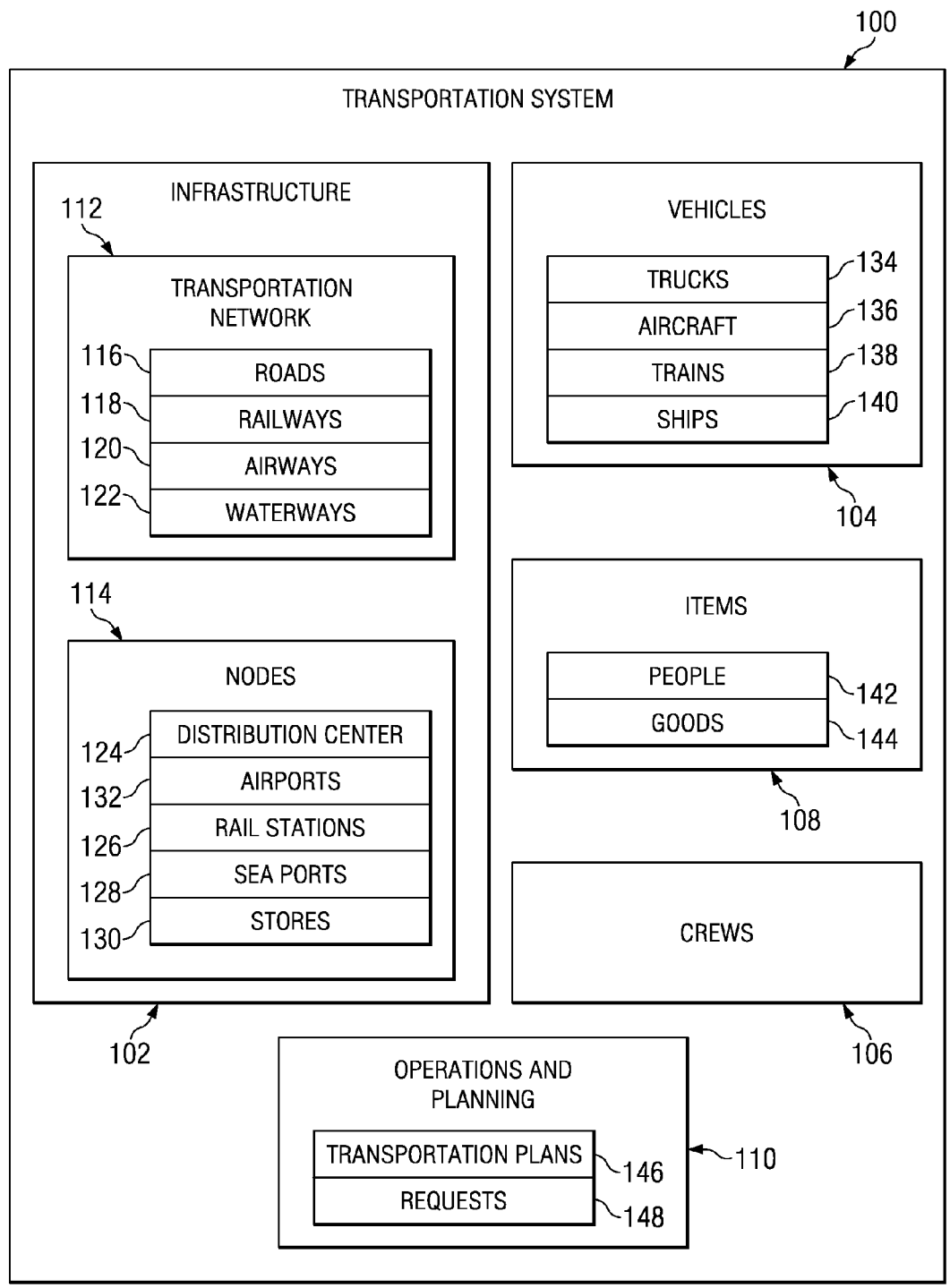
FIG. 1 is a diagram of a transportation system in accordance with an advantageous embodiment.

With reference now to the figures and in particular with reference now to FIG. 1, a diagram of a transportation system is depicted in accordance with an advantageous embodiment. In this example, transportation system 100 is an example of an environment in which the generation of plans to move items may be implemented in accordance with an advantageous embodiment. In this example, transportation system 100 includes infrastructure 102, vehicles 104, crews 106, items 108, and operations and planning 110.

Infrastructure 102 provides the structural elements through which items 108 may be transported. In this example, infrastructure 102 includes transportation network 112 and nodes 114. Transportation network 112 includes, for example, roads 116, railways 118, airways 120, and waterways 122. Roads 116 are a path between two or more places. Roads 116 may be, for example, a highway or a road in a city or town. Railways 118 contain tracks for a rail system. Airways 120 are any air routes that may be designated between different nodes 114. Waterways 122 contain navigable bodies of water. These bodies include, for example, rivers, oceans, lakes, and canals.

Nodes 114 includes, for example, distribution centers 124, airports 132, rail stations 126, seaports 128, stores 130, and any other suitable type of node or end point. These different nodes provide points at which items 108 may originate and/or terminate in the transportation of items 108 between nodes 114. In these examples, some of nodes 114 may be depots. A depot is a place where vehicle and crew schedules start and end. Other nodes, such as customer sites are not considered depots in these examples.

In these examples, vehicles 104 may take various forms, such as, for example, trucks 134, aircraft 136, trains 138, ships 140, and any other suitable vehicles.

Vehicles 104 may carry items 108 with infrastructure 102. In particular, vehicles 104 may transport items 108 between different nodes 114 using transportation network 112. Items 108 may include, for example, people 142 and goods 144.

Vehicles 104 are operated through crews 106. Crews 106 are the personnel that operate the vehicles. Crews 106 also may include maintenance personnel in some advantageous embodiments. A person within crew 106 may be, for example, a pilot, a truck driver, a train engineer, or some other suitable person for operating vehicles.

Operations and planning 110 is used to control the movement of vehicles and crew, which are transporting items 108. Additionally, operations and planning 110 also may generate transportation plans 146 for movement of items 108 in response to requests 148. Requests 148 may be received by operations and planning 110 from various customers who request the movement of items 108 within transportation system 100. For example, requests 148 may include a request from a store to receive a shipment of goods. In other examples, requests 148 may be, for example, a passenger who wishes to travel from one airport to another airport. Transportation plans 146 include vehicle routes, vehicle schedules, and crew schedules used to fulfill requests 148.

Transportation system 100 may take various forms. For example, transportation system 100 may be a train transportation system in which trains 138 carry people 142 and/or goods 144 on railways 118 to different stations in rail stations 126. In other advantageous embodiments, transportation system 100 may be a trucking transportation system in which trucks 134 move goods 144 between distribution center 124 and stores 130 using roads 116. The distribution of goods may include pickup and delivery from stores 130 and distribution center 124. In some cases, goods 144 may be picked up at distribution center 124 and delivered to stores 130. In other embodiments, the pickup also may include picking up goods 144 from stores 130 and sending those goods to distribution center 124.

In other advantageous embodiments, transportation system 100 may be a combination of different types of vehicles. For example, a package delivery company may use trucks 134 and aircraft 136 to deliver goods 144 to depots 114. In this example, depots 114 may be distribution center 124 and stores 130. Other depots also may be present in this type of transportation system. For example, other suitable nodes for depots 114 may include homes and offices.

Transportation system 100 may be for a mail and parcel delivery system. In this type of embodiment, metropolitan and interstate mail delivery may occur where drivers drive vehicles. In this type of delivery, drivers may change between vans for clearing street pillar boxes and trucks for delivering mail on pallets. In other advantageous embodiments, transportation system 100 may be, for example, an airline that transports passengers and pallets by cargo aircraft for the military. Pilots may fly transportation aircraft to transport both passengers and cargo to various areas and locations. These examples are only provided for purposes of illustration and do not limit the manner in which transportation system 100 may be implemented.

Figure 2:
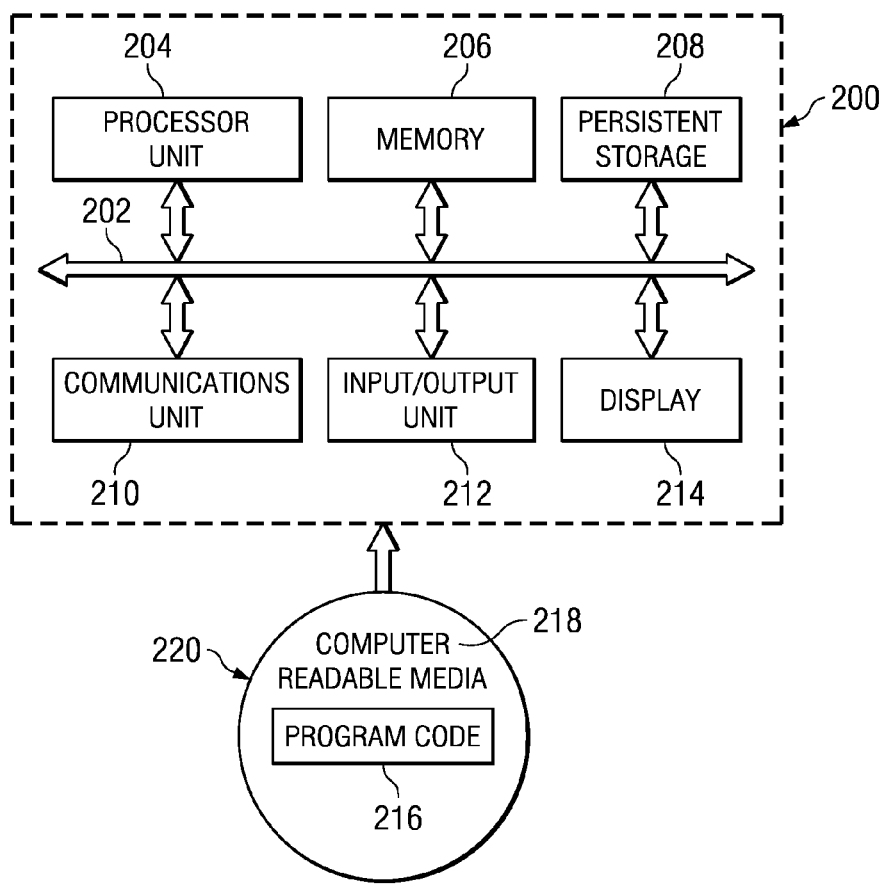
FIG. 2 is a diagram of a data processing system in accordance with an advantageous embodiment.

Turning now to FIG. 2, a diagram of a data processing system is depicted in accordance with an advantageous embodiment. Data processing system 200 is an example of a data processing system that may be implemented to generate transportation plans, such as transportation plans 146 in FIG. 1. In particular, data processing system 200 may be located at operations and planning 110 in FIG. 1. In other advantageous embodiments, a network of data processing systems, such as data processing system 200 may be implemented to solve the problem of generating a transportation plan. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that the currently used processes and programs for generating a transportation plan do not solve combined vehicle routing, vehicle scheduling, and crew scheduling problem simultaneously in which drivers are allowed to change vehicles at a depot in a transportation network during a shift.

In recognizing these features of currently available processes, the different advantageous embodiments provide a computer implemented method, apparatus, and computer usable program code that solves the combined vehicle routing, vehicle scheduling, and crew scheduling problem simultaneously, allowing drivers to change vehicles at depots in the transportation network during a shift. The different advantageous embodiments also may provide a higher quality solution. In other words, low operating costs may result from the plans generated using the different advantageous embodiments as it solves the three components of the entire problem of vehicle routing, vehicle scheduling, and crew scheduling simultaneously allowing drivers to change vehicles in a shift.

The different advantageous embodiments recognize that operational compatibility restrictions between locations and vehicle types may be present. Further, the desire to minimize the number of drop offs and pickups at customer locations also may be present. As a result, drivers may be required to change vehicle types during a single shift. The different advantageous embodiments recognize that by allowing drivers to change vehicles tightly binds the three component sub problems of vehicle routing, vehicle scheduling, and crew scheduling. This type of binding is not addressed or recognized by the currently available processes.

For problems where crew cannot change vehicles in a shift, all three components of the problem are much easier to solve: the duration of a route is the maximum shift duration resulting in a more defined vehicle routing sub problem; all routes return to base simplifying the vehicle scheduling sub problem (it reduces the vehicle scheduling sub problem to a peak counting problem); driver shifts span only a single vehicle route simplifying both the crew scheduling and vehicle routing sub problems (in effect reducing them to a single problem of creating routes with additional constraints on their legality). When crew are allowed to change vehicles, especially at locations different from their home depot, all three sub problems become much more tightly integrated.

When crew are allowed to change vehicles within their shift, then a number decisions become more tightly coupled to each other. These decisions include, for example, how long vehicle routes should be. It is undesirable to have the first route covered by a shift to be too long such that a driver does not have enough time left to perform another route using a different vehicle type. Another decision that is tightly coupled is which vehicle type should be used. For example, deciding whether to use a small vehicle at the start of a shift, because the best solution may not have any large vehicles available at the time the shift starts. Another example is where vehicle change overs within a shift should occur. A further example is deciding whether a driver should swap vehicles at a depot in the middle of the driver's shift because the first vehicle the driver was using needs to be used by another driver to perform some work that driver cannot legally perform in the second half of the shift. These examples are examples of how the three component sub problems of vehicle routing, vehicle scheduling and crew scheduling become much more tightly coupled.

Integrated in this context means that finding the lowest cost solution involves making decision that simultaneously affect vehicle routes, vehicle schedules and crew schedules. Or, there is more freedom if drivers can change vehicles, meaning there are a wider range of solutions that can be generated. However, this freedom comes at the cost of making the three sub problems more tightly coupled as the vehicle routes vehicle and crew schedules produced all have to be mutually compatible.

Thus, the different advantageous embodiments provide a computer implemented method, apparatus, and computer usable program code to generate a transportation plan in which the problems of vehicle routing, vehicle scheduling, and crew scheduling are able to be solved simultaneously without imposing undue restrictions on the solution as compared to currently available processes. The different advantageous embodiments use various processes as components for a linear and integer programming based solution approach. More specifically, the linear and integer programming based solution approach uses a set covering based mathematical formulation, solved using a column generation technique, to solve these problems simultaneously.

The different advantageous embodiments recognize that different plans for transporting items may be made more efficient by allowing drivers to change vehicles at a depot in the network during a shift. This type of variability has not been addressed by any currently available processes for generating plans that solves the three component sub problems of vehicle routing, vehicle scheduling, and crew scheduling simultaneously. The different advantageous embodiments take this and other factors into account by enabling tighter integration of the vehicle routing, vehicle scheduling, and crew scheduling sub problems.

The different advantageous embodiments solve the three component sub problems simultaneously such as in these different advantageous embodiments. Thus, the different advantageous embodiments provide a method for creating a transportation plan. Data relating to transportation requests, vehicle routing, vehicle scheduling, and crew scheduling are identified to form input data. A set of vehicle routes, a set of vehicle schedules, and a set of crew schedules are simultaneously created to deliver all the transportation requests according to the input data. In the different advantageous embodiments, these vehicle routes, vehicle schedules and crew schedules may be identified by iteratively applying a policy to an initial set of the vehicle routes, vehicle schedules, and crew schedules, where the initial set may either be part of the input data or created by the solution approach itself. This application of the policy and changes to the plan may be made until some threshold is met. This threshold may be, for example, a cost factor. In other words, changes to a set of vehicle routes, vehicle schedules, and crew schedules are made repeatedly to produce a range of new vehicle routes, vehicle schedules and crew schedules. The vehicle routes, vehicle schedules, and crew schedules may initially consist of only those that were part of the input data. The final transportation plan may be determined by choosing a mutually compatible set of vehicle routes vehicle schedules and crew schedules to transport all requests from the set of new ones created by the repeated application of the policy.

Figure 3:
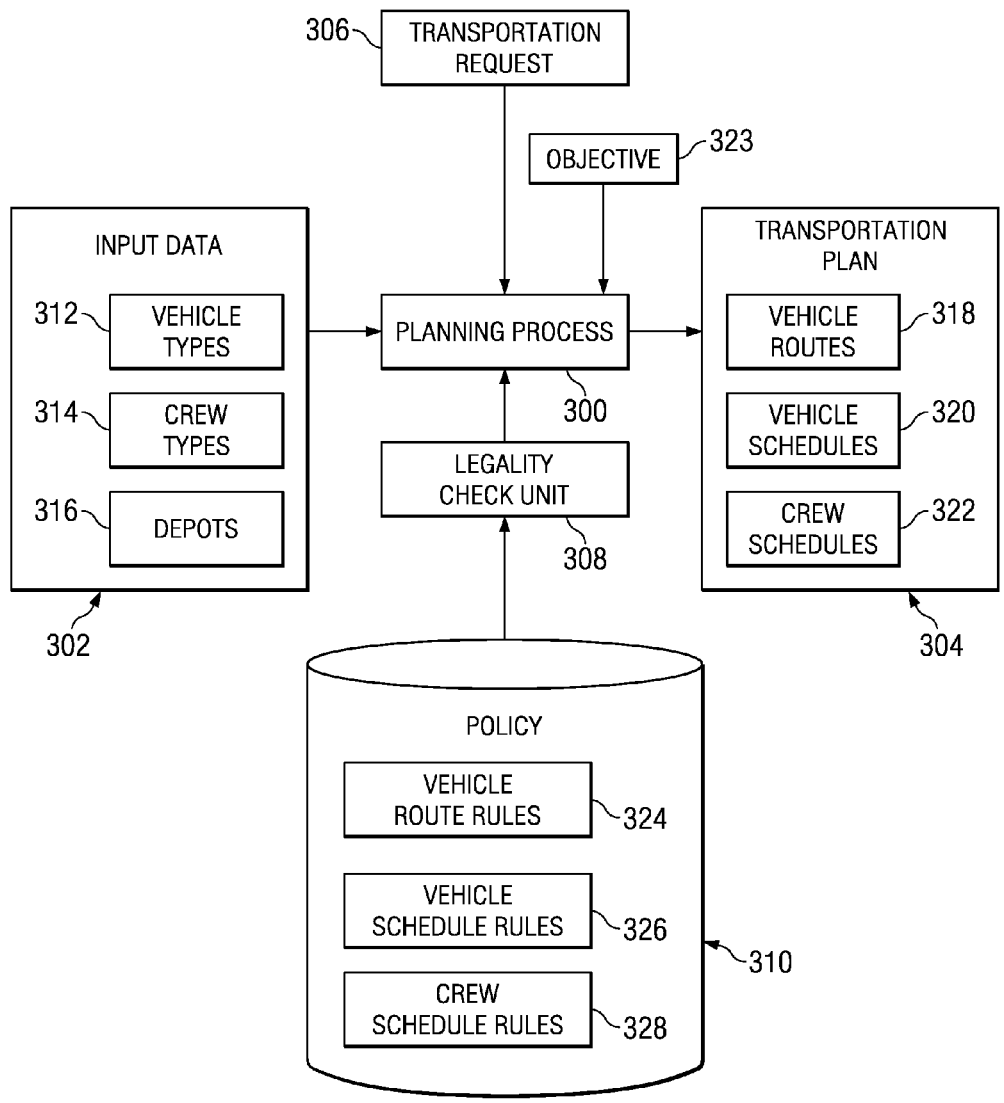
FIG. 3 is a block diagram of components used to create a transportation plan in accordance with an advantageous embodiment.

Turning now to FIG. 3, a block diagram of components used to create a transportation plan is depicted in accordance with an advantageous embodiment. Planning process 300 is an example of a planning process that may be executed in a data processing system, such as data processing system 200 in FIG. 2. Planning process 300 is an example of a planning process that may be implemented in operations and planning 110 in transportation system 100 in FIG. 1.

Planning process 300 receives input data 302 to generate transportation plan 304 in response to receiving transportation request 306. Transportation request 306 is a request to move a set of items from one location to another location. The generation of transportation plan 304 is made subject to a legality check performed by legality check unit 308 using policy 310. In these examples, input data 302 may include, for example, vehicle types 312, crew types 314, depots 316, and any other suitable data. Vehicle types 312 are used to identify vehicles and their characteristics. These characteristics may include, for example, fixed and variable operating costs for different types of vehicles. Crew types 314 may include information about individuals as well as shifts that the individuals may perform. These crew types may include fixed and variable operating costs for the different crew members.

Depots 316 contain information about locations for vehicles and crews. These locations are places where vehicle schedules and crew schedules may start and end. These are also locations where crew can change vehicles in a shift.

Input data 302 is used by planning process 300 to generate vehicle routes 318, vehicle schedules 320, and crew schedules 322 in transportation plan 304. Vehicle routes 318 identify a sequence of pickups and drop offs for individual items for a particular type of vehicle. The route starts at the location of the first pickup and ends the location of the last drop off.

A vehicle schedule 320 is made up of a set of routes for the same vehicle type as well as intervening deadhead legs to join the constituent routes together. A deadhead leg may be a leg or segment of a route in which no items are being carried. In other words, a vehicle schedule identifies what a vehicle does within the planning period of transportation plan 304. These schedules start and end at a vehicle depot. The start and end depot need not be the same depot.

A crew schedule in crew schedules 322 describes the activities undertaken by a driver for a single shift. A driver in crew schedules 322 may operate one or more vehicles during a shift. As a result, a driver may change vehicles during a shift. A driver covers one or more vehicle routes in a shift. Deadhead legs may be needed in a crew schedule for many reasons. Some non-limiting examples include using a deadhead leg to connect different vehicle routes covered by the schedule; travel from(to) the depot to(from) the first(last) location in the first(last) route covered by the schedule; or to return to a depot to incorporate a break activity.

Planning process 300 generates transportation plan 304 in a manner that meets objective 323. The objective 323, in these examples, may be to reduce the cost to transport items requested in transportation request 306 in the manner meets legality checks performed by legality check unit 308. In generating transportation plan 304, planning process 300 may optimize transportation plan 304 to meet objective 323 in the form of some threshold or to meet some threshold for a cost.

In performing this optimization, vehicle routes, vehicle schedules, and crew schedules are selected in a manner that conforms to policy 310. Policy 310 ensures that transportation plan 304 is a legal transportation plan. A legal transportation plan is one that meets the various rules and regulations that may apply to transporting items.

In these examples, policy 310 includes vehicle route rules 324, vehicle schedule rules 326, and crew schedule rules 328. These different rules govern how vehicle routes 318, vehicle schedules 320, and crew schedules 322 may be set. Vehicle route rules 324 may identify rules for various constraints as to how vehicles may be routed and used.

For example, vehicles may have to meet rules such as those for capacity restrictions, load configurations, speeds, loading durations, unloading durations, allowable flight paths, compatibility with different type of items, and other suitable information. As another example, with the compatibility of items, some items may be required to be refrigerated while other items such as passengers may require seats to be present in the vehicle.

Vehicle schedule rules 326 may govern the manner in which vehicles may be scheduled. For example, these rules may identify what vehicles may be used on particular routes, the minimum duration between consecutive routes, and other suitable information.

Crew schedule rules 328 may include rules regarding, for example, maximum shift duration, maximum driving time in a shift, maximum driving time before a break, maximum driving time after a break, maximum break durations, minimum break durations, qualification for operating different vehicles, and other suitable rules. These different rules in policy 310 may be set by federal rules, state rules, or city rules. The different rules in policy 310 also may include rules set by agreement between different organizations or companies, rules set internally within a company, or any other sort of rules that provide constraints as to how transportation plan 304 may be generated. These different rules, in these embodiments, are presented to provide examples and are not meant to limit the rules that may be used in generating a transportation plan.

Figure 4:
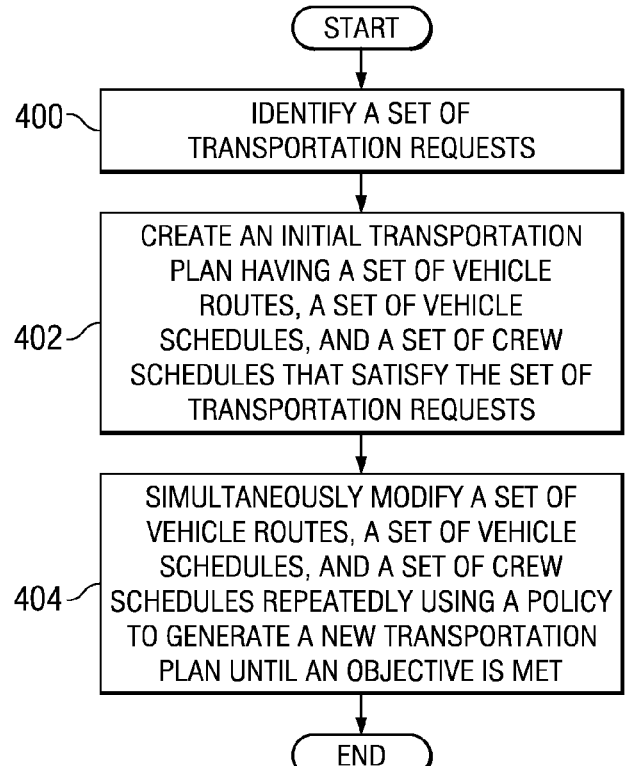
FIG. 4 is a high level flowchart of a process for generating a transportation plan in accordance with an advantageous embodiment.

With reference now to FIG. 4, a high level flowchart of a process for generating a transportation plan is depicted in accordance with an advantageous embodiment. The process illustrated in FIG. 4 may be implemented in a software component, such as planning process 300 in FIG. 3.

The process begins by identifying a set of transportation requests (operation 400). The set of transportation requests may include a transportation request, such as transportation request 306 in FIG. 3. The process then creates an initial transportation plan having a set of vehicle routes, a set of vehicle schedules, and a set of crew schedules that satisfy the set of transportation requests (operation 402). This operation generates an initial transportation plan. The set of vehicle routes, the set of vehicle schedules, and the set of crew schedules are mutually compatible. In other words, the set of vehicle schedules, and the set of crew schedules are one in which the routes and schedules all are ones that work or can be performed in the manner they are arranged.

Operation 402 may be implemented using known enumeration techniques. Enumeration is a process or procedure for listing all members of a set in some definite sequence. In these examples the sets are the set of vehicle routes, the set of vehicle schedules and the set of crew schedules. This initial transportation plan is the problem that is to be solved to meet an objective, such as cost, time, and/or some other suitable objective.

The set of vehicle routes is one sub problem, the set of vehicle schedules is another sub problem, and the set of crew schedules is the third sub problem in these examples. These sub problems are solved to meet the set of transportation requests. Further, these sub problems are also solved to meet the objective. In solving a sub problem, the set, such as the set of vehicle routes, is selected in a manner that allows for the set of transportation requests to be satisfied or completed.

The process then simultaneously modifies a set of vehicle routes, a set of vehicle schedules, and a set of crew schedules repeatedly using a policy to generate a new set of vehicle routes, vehicle schedules and crew schedules until an objective is met. The final transportation plan is determined by choosing a mutually compatible subset of vehicle routes, vehicle schedules and crew schedules to transport all requests from the entire set of new ones created by the repeated application of the policy. (operation 404). This operation is performed to change the set of vehicle routes, the set of vehicle schedules, and the set of crew schedules to move closer to or meet the objective. Operation works by changing these sets simultaneously.

Further, operation 404 continues to simultaneously modify the set of vehicle routes, the set of vehicle schedules, and the set of crew schedules to move closer to or meet the objective. In this manner, the process produces a range of potential vehicle routes, vehicle schedules, and crew schedules as the process progress. The process then selects the least cost set of these potential vehicle routes, vehicle schedules and, crew schedules to perform the transport request.

In these advantageous embodiments, the problem includes sub problems of identifying vehicle routes, vehicle schedules, and crew schedules. The problem is a simultaneous vehicle routing and vehicle and crew scheduling problems with time windows. This type of problem is one in which drivers may change vehicles at any depot in the network during a shift. More specifically, this problem involves finding a set of mutually compatible vehicle routes, vehicle schedules, and crew schedules to deliver a given set of items at least cost. This problem involves using a heterogeneous set of vehicle and driver types based at different depots.

Figure 5A:
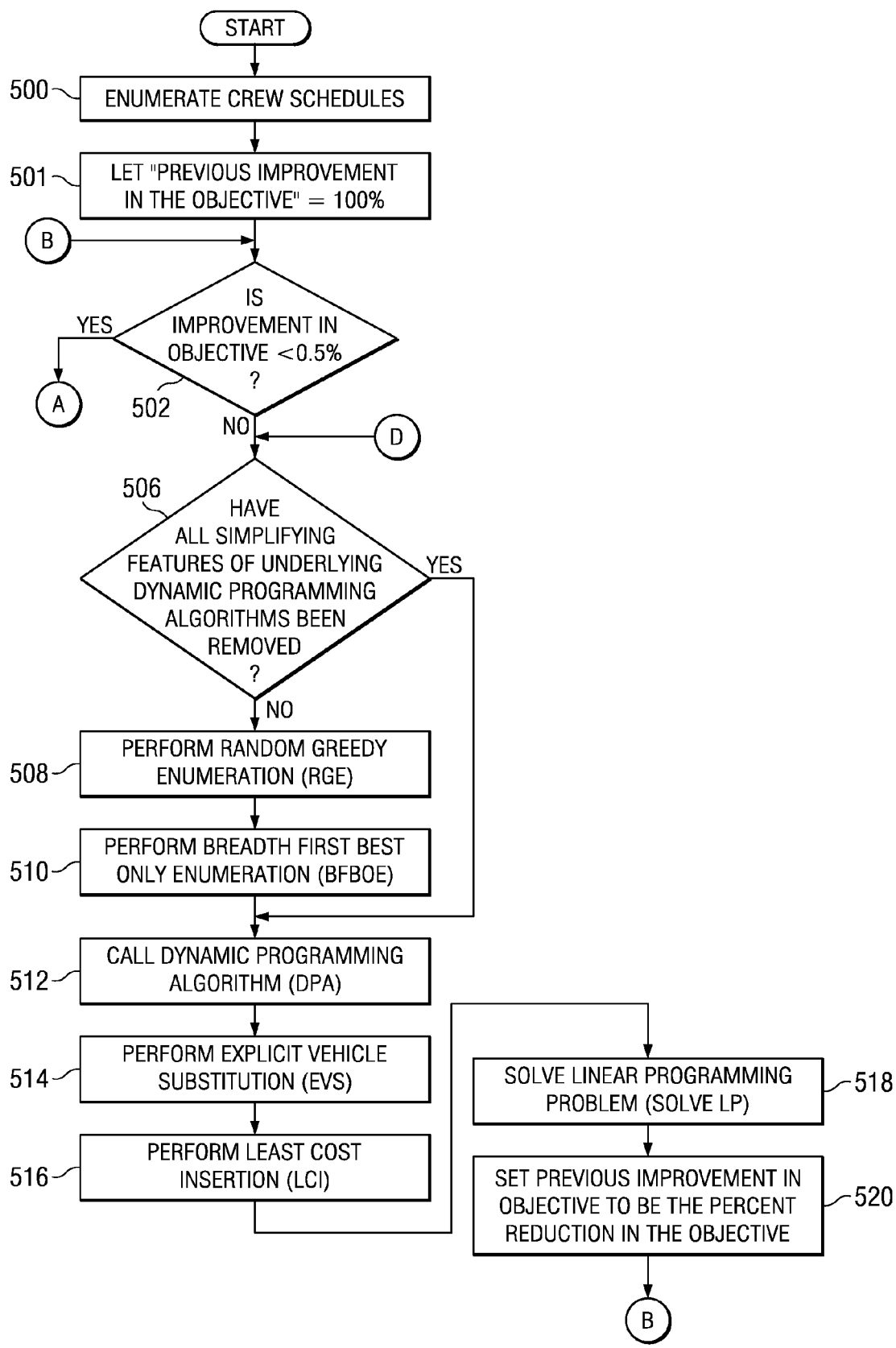
FIGS. 5a and 5b are a flowchart of a process for generating a transportation plan in accordance with an advantageous embodiment.
Figure 5B:
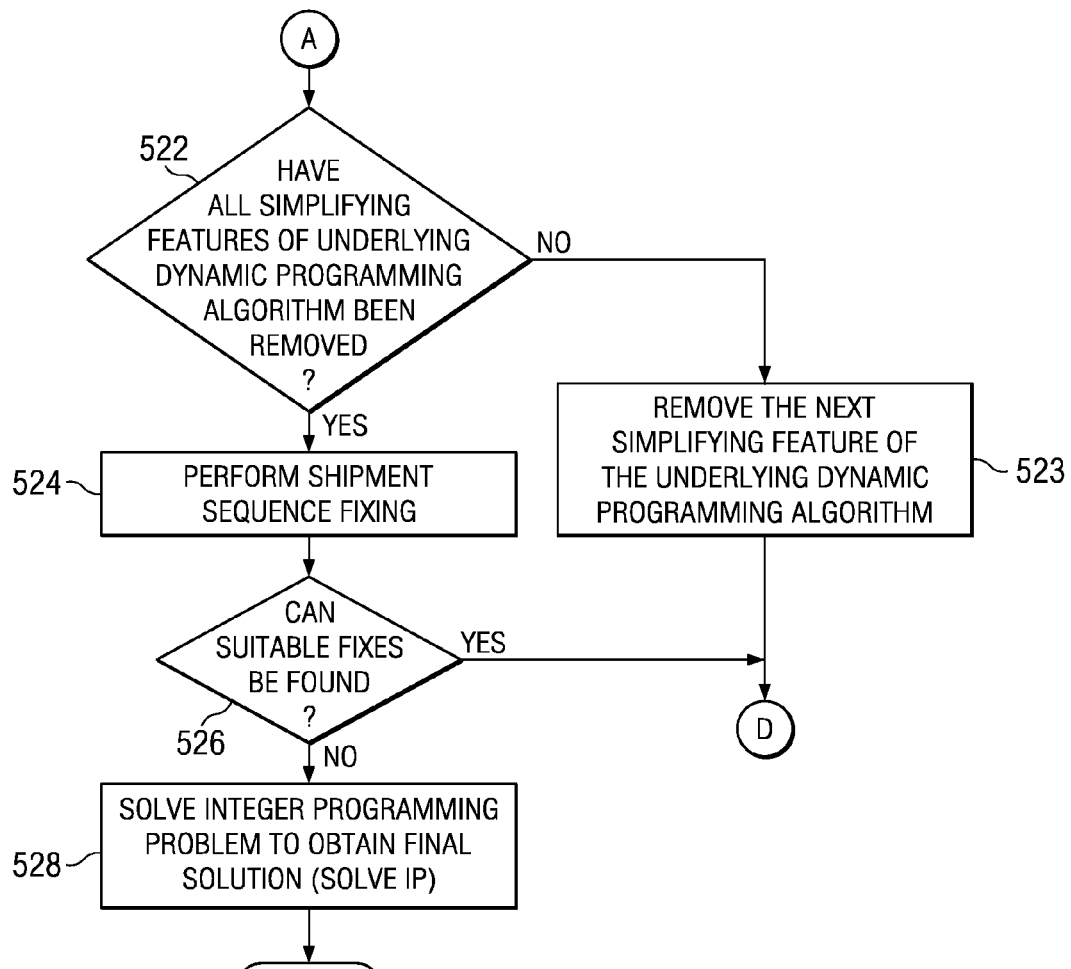

With reference now to FIGS. 5a and 5b, a flowchart of a process for generating a transportation plan is depicted in accordance with an advantageous embodiment. The process illustrated in FIGS. 5a and 5b may be implemented in a software component, such as planning process 300 in FIG. 3. This flowchart illustrates a column generation algorithm which is used to generate a transportation plan, such as transportation plan 304 in FIG. 3. This column generation algorithm is more specifically a price-and-branch algorithm in these examples. The term column generation simply refers to the process of creating new vehicle routes, vehicle schedules, and crew schedules to reduce the overall cost of a transportation plan.

This process incorporates vehicle route and vehicle and crew schedule generation techniques to generate the transportation plan. The different operations employ a standard least cost insertion technique and a dynamic programming algorithm to solve the sub-problems of vehicle routes, vehicle schedules, and crew schedules simultaneously. Least cost insertion is used in this process to create routes. These routes are then processed into tasks and these tasks are then used to create schedules. The schedules are created using a dynamic programming algorithm in these examples.

The dynamic programming algorithm uses an abstract network, without an explicit time dimension, built around the set of tasks to be covered and the methods in which they can be connected in a crew schedule to generate specifically timed crew schedules. In these examples, the tasks are created from vehicle routes as described above. The dynamic programming algorithm may provide handling of time windows on tasks to identify the best possible timing of the generated crew schedules to minimize the number of vehicles used. The least cost insertion technique and the dynamic programming algorithm may be implemented using standard processes for these types of techniques.

In the advantageous embodiments, a route is a sequence of pick ups and drop offs of individual shipments for a specific vehicle type. A route starts at the location of the first pick up and ends at the location of the last drop off. A route does not include specific timings for the pick ups and drop offs in the route, but does include the range of legal times that the pick up and drop offs can occur. Tasks are created from routes and are the building blocks for crew schedules. A task represents a route or a portion of a route within a crew schedule. Vehicle and crew schedules are made up of a combination of tasks and start and end at the same depot.

Further, the different operations in FIGS. 5a and 5b are performed to provide vehicle routes, vehicle schedules, and crew schedules that are legal. In other words, the routing and scheduling performed is checked against a policy, such as policy 310 in FIG. 3 to ensure that the results fit the rules and/or constraints defined by the policy.

The different components in this process to create a transportation plan include explicit enumeration, breadth first best only enumeration, random greedy enumeration, explicit vehicle substitution, least cost insertion, and direct calls to a dynamic programming algorithm.

In these examples, operation 500 is an example of operation 402 in FIG. 4. The other operations, in these illustrative examples, form a more detailed example of operation 404 in FIG. 4.

The process begins by enumerating all single item crew schedules using all vehicle and driver combinations based at all available depots (operation 500). For each pair of items to be transported the process then creates a single crew schedule using the least cost vehicle, driver type and depot combination. For a given pair of items to be transported, if a schedule exists, the shipments are then deemed compatible. Compatibility information is used in many places throughout the solution process to ensure that crew schedules that can never be legal are not investigated. Most notably, arcs in the network used by the dynamic programming algorithm between tasks carrying shipments that are not compatible can be eliminated and only compatible shipments are considered for insertion into a crew schedule.

The process sets the previous improvement in the objective value of the solution to the linear program to 100 percent (operation 501). In these examples, the objective is a term for the function that the linear program tries to minimize. Next, a determination is made as to whether the previous improvement in the objective has improved by less than around 0.5 percent (operation 502).

In these examples, an objective may be the total cost of the vehicle routes, the vehicle schedules, and the crew schedules in the solution. Although the threshold value in this example is around 0.5 percent, other numbers may be used depending on the particular implementation. If the improvement in the objective is not less than around 0.5 percent, a determination is made is to whether all of the simplifying features of the underlying dynamic programming algorithm have been removed (operation 506).

If not all of the simplifying features have been removed, the process then performs random greedy enumeration (RGE) (operation 508). This process uses a random greedy enumeration technique to create new crew schedules. This process joins together routes covered by previously created crew schedules.

This operation uses an algorithm that is extremely simple and widely known and would not require a detailed description. This process involves taking a set of tasks, sorting the tasks by start time, taking the first task and add the next closest task that starts after the first task finishes and can legally be combined in a schedule, keep adding tasks to this crew schedule until no more can be added, removes all the tasks that have just been added to this crew schedule, which starts with the first task from the set of tasks. These steps are repeated until no tasks remain in the set.

The set of tasks resulting from a random selection of routes from the set of routes used by schedules in the current set of shifts maintained by the solution process is used by a simple greedy (next closest in time) enumeration algorithm to generate a set of schedules. Operation 508 is capable of processing a large number of tasks very quickly but is only effective during the early stages of the solution process.

The process then performs a breadth first best only enumeration (BFBOE) (operation 510). This process employs an intelligent breadth first enumeration algorithm to create vehicle routes and crew schedules. These routes and schedules are created by incrementally adding single transportation requests. The process then calls the dynamic programming algorithm (DPA) (operation 512). This call is made to obtain new crew schedules by joining together routes covered by previously created crew schedules in new ways.

Calls to the dynamic programming algorithm with a given set of specifically chosen tasks consistently generate new vehicle routes and crew schedules throughout the solution process. This set of tasks chosen is comprised of the set of tasks covered by crew schedules appearing in the previous N linear solutions, where N is a parameter, plus a set of tasks resulting from a random selection from the set of tasks used by schedules in the current set of shifts maintained by the solution process, to ensure a minimum set size is achieved.

The process then performs explicit vehicle substitution (EVS) (operation 514). This process attempts to change the vehicles being used to cover routes and schedules to another vehicle type. This change is used in an attempt to reduce the total number of vehicles that may be required for the transportation plan. The process then performs least cost insertion (LCI) (operation 516). This process creates new schedules by adding single items to a subset of the existing crew schedule in an intelligent manner.

The process then solves a linear programming problem (solveLP) (operation 518). The solving of a linear programming problem is also referred to as a call to SolveLP, which is a function in these examples. Operation 506 involves optimizing a linear objective function subject to various linear equality and inequality constraints. This optimization is performed to maximize or minimize a real function systematically by choosing the values of variables within an allowed set. In other words, operation 506 is performed to solve a mathematical formulation. In these examples, the mathematical formulation is one that models a problem that is solved to attain the transportation plan.

The process then sets the previous improvement in the objective to be the percentage reduction in the objective obtained from solving the linear program using the new vehicle routes, vehicle schedules, and crew schedules that have been generated (operation 520). The process then returns to operation 502 as described above.

With reference again to operation 506, if all of the simplifying features have been removed, the process proceeds directly to operation 512 as described above.

With reference again to operation 502, if an improvement in the objective is less than around 0.5 percent, a determination is made as to whether all of the simplifying features of the underlying dynamic programming algorithm have been removed (operation 522). If not all of the simplifying features have been removed, the process removes the next simplifying feature of the underlying dynamic programming algorithm (operation 523). In these examples, the dynamic programming algorithm has three simplifying features that may be removed. These features are (1) executing the dynamic programming algorithm for all depots simultaneously allowing labels representing schedules from different depots to dominate each other; (2) computing domination with respect to a reduced set of domination attributes; and (3) removing arcs in the network used by the dynamic programming algorithm that investigate delaying preparation activities that must take place in a crew schedule when joining tasks for different vehicle types with a crew schedule. In these illustrative examples, each of these features may be removed in the listed order.

In these examples, when the simplifying features are removed, the dynamic programming algorithm is an exact algorithm. The dynamic programming algorithm solves the problem exactly. When some or all of these features are in effect, or have not been removed, the algorithm executes much faster but is no longer exact. In other words, the algorithm is reduced to a fast heuristic algorithm. Initially, the inexact mode is useful, but eventually the problem being solved by the algorithm becomes so difficult that solutions can only be found using an exact algorithm. In these situations, a heuristic one will not find the answer.

Next, the process proceeds to operation 506 as described above. Otherwise, the process performs shipment sequence fixing (operation 524). In these examples, a shipment is also referred to as a transportation request or item. Shipment delivery sequence fixing is the process of identifying specific pairs of shipments during the solution process, and forcing them to appear with a given pick up and/or drop off sequence within a single shift in the solution. For example, assume a shipment must be delivered according to the specific sequence and must be delivered by the same shift, it is the process of starting to lock in a final solution. A shipment is a quantity of goods with an origin, a destination, and a specific time window for delivery in these examples.

Operation 524 does not fix every shipment into a delivery sequence it only fixes some, the final solution is found from solving the mathematical formulation the final time and enforcing all binary variables to take integer values.

Shipment delivery sequence fixing may be performed using a number of different processes. The following is an example of different types of shipment delivery sequences for a shipment sequence that can be performed:

(1) Pick up both at the same stop on the same route
(2) Drop off both at the same stop on the same route
(3) Drop off first then pick up second at the same stop on the same route
(4) Pick up at first stop then drop off at next stop on the same route
(5) Pick up at first stop then pick up at next stop on the same route
(6) Drop off at first stop then pick up at next stop on the same route
(7) Drop off at first stop then drop off at next stop on the same route
(8) Drop off at the last stop on one route and then pick up at same stop at the beginning of a second route
(9) Drop off at the last stop on one route, then pick up at another stop at the beginning of a second route This set is an example of types of shipment delivery sequences that can be imposed on pairs of shipments. In this example, a stop is defined as a location visited by route in which a drop off and/or pick up of a shipment occurs.

The shipment delivery sequence types 1-7 are used to fix delivery sequences within a single route within a crew schedule. The shipment delivery sequence types 8 and 9 are used to fix delivery sequences between routes in the same crew schedule.

The constraints defining both potential shipment delivery sequence fixes during the solution process and high priority branching variables introduced prior to solving the final integer program (to help speed up the solution of the final integer program) are: Let $I_{jk}^n$ be the set of schedules that deliver both shipments $j \in S$ and $k \in S$ (where S is the set of all shipments) with a delivery sequence of type $n \in$ shipment delivery sequence, branching variables are introduced which are defined by $$\sum_{i \in I_{jk}^n} y_i = e_{jk}^n$$

for all pairs of shipments j, k that are delivered with a delivery sequence of type n in at least one schedule. Here $y_i$ is the variable in the mathematical formulation given below representing crew schedule i. In the depicted examples, the shipment delivery shipment fixing process begins when all dynamic programming alterations have been removed and improvement in the linear object is below some threshold.

In these illustrative examples, a specific number of shipment delivery sequence fixes are performed each time operation 524 is performed. For each iteration, fixing those with the highest value (namely $e_{jk}^n$) first, down to those above a given minimum threshold (0.6 for example). Each candidate shipment delivery sequence is probed if required (i.e. a schedule that violates the shipment delivery sequence appears in the basis of the solution to the linear programming formulation) and only those fixes that result the linear objective increase below a given threshold are implemented.

Probing a shipment delivery sequence involves modifying the constraint matrix to remove shipments from schedules that cause a violation of the delivery sequence and resolving the linear programming problem. Most linear programming packages allow the constraint matrix to be modified in memory and the previous basis to be reused allowing for fast resolves. Implementing a specific shipment delivery sequence fixing involves removing shipments from schedules that cause a violation of the given delivery sequence as well as ensuring any vehicle route that are generated after the shipment delivery sequence fixing has been performed do not violate the sequence.

Next, a determination is made as to whether suitable shipment delivery sequence fixes can be found (operation 526). If suitable fixes can be found, the process proceeds to operation 512. Otherwise, the process solves the integer programming formulation to obtain a final solution for the transportation plan (operation 528) with the process terminating thereafter. The optimization, in these examples, is performed to maximize or minimize a real function systematically by choosing the values of variables within an allowed set. An integer formulation is a mathematical formulation in which some of the variables must take integer values.

In these examples, the process in FIGS. 5a and 5b generate a transportation plan that solves a transportation problem, which is also referred to as a simultaneous vehicle routing, vehicle scheduling, and crew scheduling problem with time windows. In this problem, a set of mutually compatible vehicle routes, vehicle schedules, and crew schedules are obtained to form the transportation plan. With this problem, sets and associated sub-sets, variables, costs, and problem data are presented below to define the mathematical formulation used by the solution process. The phrase "solve the final integer" program means solving the formulation described here. The Phrase "solve the LP" means solving the mathematical formulation listed here but without forcing any variables to take integer values.

Sets and associated subsets: Let T, indexed by t, be the set of time points representing a one minute discretisation of the cyclical 24 hour planning horizon.

A cyclical planning horizon means that the minimum and maximum times within the planning horizon are represented by the same time index. Let $t_c$ represent a particular time used to count vehicles in operation, the counting time. Let t− represent the time point immediately before that represented by t. Let L, indexed by l, be the set of locations. Let $D \subset L$, indexed by d, be the set of depot locations. Let V, indexed by v, be the set of vehicle types. Let M=D×V, indexed by m, be the set of vehicle type-depot combinations. Let $M_v \subset M$ be the set of vehicle type-depot combinations for vehicle type v. Let S, indexed by s, be the set of shipments. Let P, indexed by p, be the set of crew types. Let J=D×P, indexed by j, be the set of crew type-depot combinations. Let $J_p \subset J$ be the set of crew type-depot combinations for driver type p.

Let I, indexed by i, be the set of all legal crew schedules given the specific column generation approach we use to construct crew schedules. Let $I_j^{ctd}$ $j \subset I$ be the set of crew schedules for crew type-depot j (where for crew type-depot is denoted by the superscript "ctd"). Let $I_s^{shp}$ s be the set of crew schedules that deliver shipment s (where deliver shipment is denoted by the superscript "shp"). Let $I_{mlt}^{fr}$ the set of crew schedules that finish a return activity (where finish return is denoted by the superscript "fr") for a vehicle of vehicle type-depot combination m at location l at time t. Let $I_{mlt}^{bp}$ the set of crew schedules that begin a prep activity (where begin prep is denoted by the superscript "bp") for a vehicle of vehicle type-depot combination m at location l at time t. Let $I_{mt}^{o} \subset I$ be the set of crew schedules that are using a vehicle of vehicle type-depot combination m at time t, i.e. a piece of work within the crew schedule being covered by a vehicle of vehicle type-depot m spans the time point (or is in operation at the time point, denoted by the superscript "o") associated with t.

Variables: The variables in the model are $y_i$, $n_j$, $N_{mlti}$ and $q_m$. The binary variable $y_i$ is equal to one if and only if crew schedule i is in the solution. The variable $n_j$ is only used to represent the total number of crew schedules of crew type-depot j. It can be eliminated, but its inclusion makes the formulation more readable. The variable $N_{mlti}$ is used to represent the number of vehicles of vehicle type-depot m at location l at time t that are not being used at time t, i.e. not part of a route in a crew schedule in operation at time t. The variable $q_m$ is used to represent the total number of vehicles of vehicle type-depot m.

Costs: The costs in the model are $f_j$, $g_m$, and $h_i$. $f_j$ is the fixed cost for a crew schedule of crew type-depot j. $g_m$ is the fixed cost associated with each vehicle type-depot combination m and $h_i$ is the combined variable vehicle and crew costs for crew schedule i.

Problem data: Let $MMAX_m$ be the capacity associated with vehicle type depot combination m. Let $VMAX_v$ be the maximum number of vehicles available of vehicle type v. Let $PMAX_p$ be the maximum number of drivers available for crew type p and let $JMAX_j$ be the maximum number of drivers available for crew type-depot combination j. The problem formulation for the transportation plan is:

$$\text{Minimise} \sum_{i \in I} h_i y_i + \sum_{j \in J} f_j n_j + \sum_{m \in M} g_m q_m \quad (1)$$

subject to:

$$\sum_{i \in I_s^{bp}} y_i \geq 1 \ \forall s \in S \quad (2)$$

$$\sum_{i \in I_j^{ctd}} y_i = n_j \ \forall j \in J \quad (3)$$

$$n_j \leq JMAX_j \ \forall j \in J \quad (4)$$

$$\sum_{j \in J_p} n_j \leq PMAX_p \ \forall p \in P \quad (5)$$

$$N_{mlt^-} + \sum_{i \in I_{mlc}^{fr}} y_i - \sum_{i \in I_{mlr}^{bp}} y_i = N_{mlt} \ \forall m \in M, l \in L, t \in T \quad (6)$$

$$\sum_{l \in L} N_{mlt_c} + \sum_{i \in I_{mtc}^o} y_i = q_m \ \forall m \in M \quad (7)$$

$$q_m \leq MMAX_m \ \forall m \in M \quad (8)$$

$$\sum_{m \in M_v} q_m \leq VMAX_v \ \forall v \in V \quad (9)$$

$$N_{mlt} \geq 0 \ \forall m \in M, l \in L, t \in T \quad (10)$$

$$y_i \in \{0, 1\} \ \forall i \in I \quad (11)$$

The set of constraints in equation (2) ensures that all shipments are covered by at least one crew schedule. Constraint sets in equation (3) to equation (5) model the crew type restrictions. The set of constraints in equation (3) are used to define variables representing the number of crew schedules for a particular crew type-depot. The set of constraints in equation (4) enforces the maximum number of crew schedules of a particular type that can be operated out of a particular depot. The set of constraints in equation (5) enforces the maximum number of crew schedules of a particular type that can be operated across all depots.

Constraint sets in equations (6) to (9) model the vehicle type restrictions. The set of constraints in equation (6) and equation (10) ensure a legal circulation of vehicles in the network. The set of constraints in equation (7) is used to count the number of vehicles of vehicle type depot m by taking a slice through the circulation at a particular time, noting those vehicles in operation and those waiting at depots. The set of constraints in equation (8) enforces the maximum number of vehicles of each type that are allowed to be depoted at a particular location. The set of constraints in equation (9) enforces the maximum number of vehicles of a particular type that can be operated across all depots. Finally, binary requirements on crew schedule variables are given by equation (11).

With reference now to FIG. 6, a diagram illustrating code for generating a transportation plan is depicted in accordance with an advantageous embodiment. Code 600 in FIG. 6 is an example of implementation of pseudo code for the process illustrated in FIGS. 5a and 5b. In code 600, ImplementDPAAlterations( ) employs the full list of alterations to the dynamic programming algorithm listed above. RemoveNextDPAAlteration( )removes the next applicable dynamic programming algorithm alteration. AllDPAAlterationsRemoved( ) returns true if all the dynamic programming algorithm alterations have been removed and false otherwise.

PrunePool( ) is a function that removes schedules with highest reduced cost (where reduced cost is a term from linear programming theory) from the set M until |M| (the size of the set) is below a given threshold. SolveLP(M) returns the improvement in the value of the linear objective over the value of the previous linear objective from solving the linear programming formulation (given above). PerformFixing( ) is the result of analyzing the shifts in the current linear solution and implementing shipment sequence fixings (as previously described). If no fixing can be performed, this component returns true otherwise it returns false.

In FIG. 6, the text Repeat(ALG, M) means repeatedly calling the function ALG while the reduction in the linear objective obtained from solving the linear programming formulation (given above) using the set of schedules generated using M is greater than some threshold. In these examples, ALG refers to M=MURGE( ), M=MUBFBOE( ), M=MUCDPA( )). If you look at the figure there is text like "Repeat(M=MURGE( ),M)" so alg in this case means executing M=MURGE( ) which means generating new schedules using random greedy enumeration RGE and adding these new schedules to the set M. Indeed there is no pseudo code for the random greedy enumeration.

With reference now to FIG. 7, a diagram code for breadth first best only enumeration is depicted in accordance with an advantageous embodiment. Code 700 is an example of implementation of code for operation 510 in FIGS. 5a and 5b. Code 700 may be used to produce shifts that deliver many shipments. In these examples, code 700 is employed only during the earlier stages of the solution process before simplifying features of the underlying dynamic programming algorithm have been removed.

In this example, LeastCostSingleShipmentSchedule(s) is the least cost single shipment crew schedule that covers only shipment s; R(c)is the set of routes covered by schedule c; S(c) is the set of shipments compatible with those covered by schedule c. CreateNewTasksByLeastCostInsertion(s, r, v, c) is the set of tasks created by changing the vehicle type of route r to v then inserting shipment s, at least cost, both noting any previous activity (i.e. routes covered in the schedule prior to r) on schedule c (so that a break can be inserted within the route if required) and ignoring any previous activity (so a break is only inserted within the route if the route itself is long enough to warrant a break).

DPA(X) is the set of schedules generated from calling the dynamic programming algorithm using the set of tasks X. LRC(N, c) is the schedule with the least reduced cost (where reduced cost is term from linear programming theory) that covers one more shipment than that covered by schedule c in the set of schedules N or Null if no such schedule exists. NRC(N) is the subset of schedules with negative reduced cost from the set of schedules N.

With reference now to FIG. 8, a diagram illustrating code for explicit vehicle substitution is depicted in accordance with an advantageous embodiment. Code 800 is an example of code that may be used to implement operation 514 in FIGS. 5a and 5b. For each vehicle type in the current solution to the linear formulation (given above), a range of time points is present when the maximum number of vehicles is in operation, either waiting at a depot different from the home depot or being used by a schedule. Crew schedules directly contributing to this vehicle peak, ones that are actually using a vehicle over such a time point, are candidates for vehicle substitution. This component is extremely fast; however, it rarely results in the generation of a negative reduced cost shift.

The vehicle substitution component can be summarized using the following pseudo code where C(v) is the set of schedules directly contributing to the vehicle peak for vehicle type v and VehSub(r, v, c) is the set of legal routes created by changing the vehicle type of route r to v.

With reference now to FIG. 9, a diagram of code for least cost insertion is depicted in accordance with an advantageous embodiment. Code 900 is an example of code that may be used to implement operation 516 in FIGS. 5a and 5b. In these examples, least cost insertion is considered a main or primary component in solution technique that is used to generate crew schedules.

In code 900, SeedSet is the set of schedules (unique with respect to both the shipments covered and the specific delivery sequence used) chosen from the set maintained by the solution process on the basis of reduced cost and V(t) is the vehicle type associated with the task t. The use of dynamic programming algorithms in these examples is implemented using one of the techniques for dynamic programming. A dynamic programming algorithm is a process that may be used to solve a resource constrained shortest path problem. In these illustrative examples, only a simple dynamic programming algorithm is used in the process to solve what is called in linear programming theory "the pricing problem in column generation".

Figure 10:
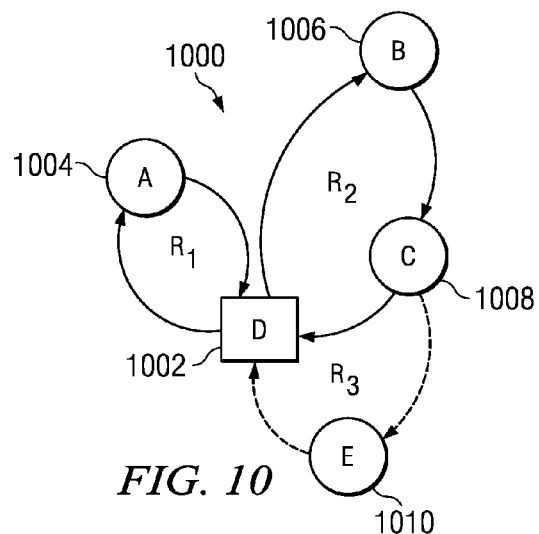
FIG. 10 forms the first part of an illustration of the least cost insertion process for an example data set in accordance with an advantageous embodiment.

Turning now to FIG. 10, an illustration of a data set is depicted in accordance with an advantageous embodiment. This figure illustrates how tasks are created, using a least cost insertion technique, in accordance with an advantageous embodiment, to represent routes produced by inserting single shipments into a route within an existing schedule. Tasks are created from routes and are the building blocks for crew schedules. A task represents a route or a portion of a route within a crew schedule. Tasks form the input data to the dynamic programming algorithm which generates new crew schedules by joining together specific sets of tasks.

In this example, transportation system 1000 includes depot 1002, customer A 1004, customer B 1006, customer C 1008, and customer E 1010. In this example, routes $R_1$, $R_2$, and $R_3$ are present. In this example, six shipments are present. These shipments are shipments $S_1$, $S_2$, $S_3$, $S_4$, $S_5$, and $S_6$. Shipment $S_1$ goes from depot 1002 to customer A 1004. Shipment $S_2$ goes from customer A 1004 to depot 1002. Shipment $S_3$ goes from depot 1002 to customer B 1006. Shipment $S_4$ goes from customer B 1006 to depot 1002. Shipment $S_5$ goes from customer C 1008 to depot 1002. Shipment $S_6$ goes from customer E 1010 to depot 1002. In these examples, the routes are defined as follows: Routes $R_1=Pi(S_1)Dr(S_1)Pi(S_2)Dr(S_2)$; $R_2=Pi(S_3)Dr(S_3)Pi(S_4)Pi(S_5)Dr(S_5)Dr(S_4)$; and $R_3=Pi(S_3)Dr(S_3)Pi(S_4)Pi(S_5)Pi(S_6)Dr(S_6)Dr(S_5)Dr(S_4)$ where $Pi(S_1)$ means picking up shipment $S_1$ and $Dr(S_1)$ means drop off shipment $S_1$.

Initially there are only two routes, routes $R_1$ and $R_2$. $R_1$ transports shipments $S_1$ and $S_2$ with a pick up drop off sequence that delivers $S_1$ before picking up shipment $S_2$.

Figure 11:
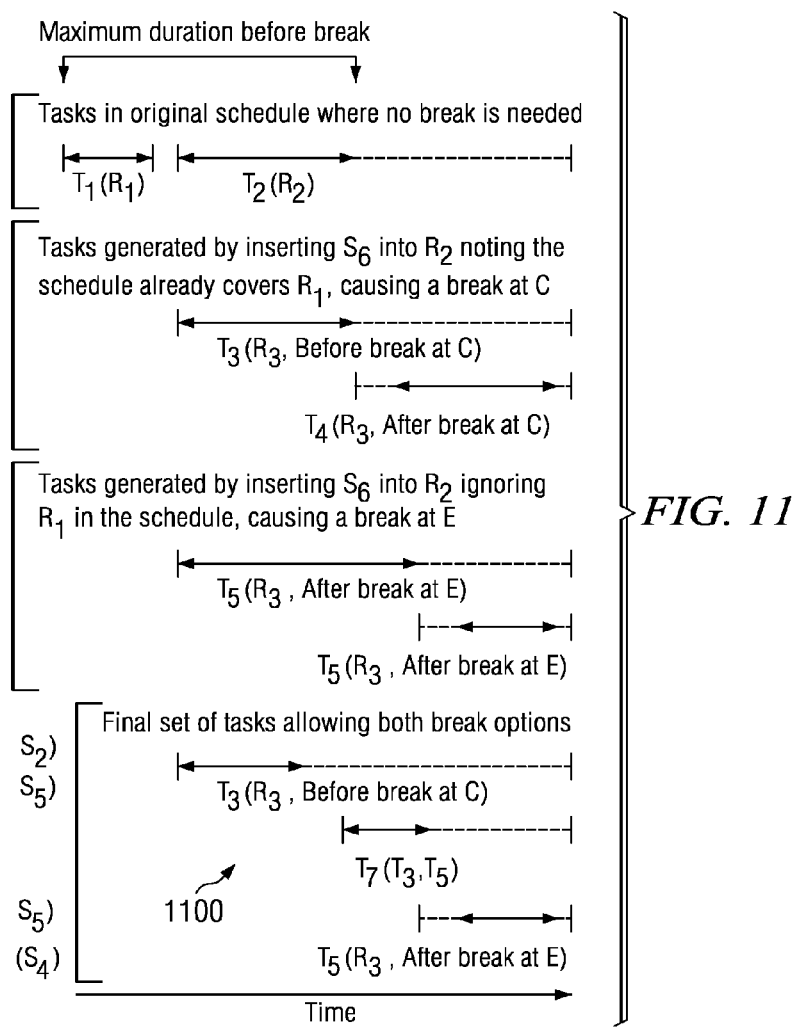
FIG. 11 forms the second part of an illustration of the least cost insertion process in accordance with an advantageous embodiment.

Turning now to FIG. 11, a diagram illustrating tasks performed over time is depicted in accordance with an advantageous embodiment. In diagram 1100, consider a single shift that does not include a break, made up of tasks $T_1$ and $T_2$ representing route $R_1$ and $R_2$ respectively. FIG. 11 illustrates the tasks created from inserting S6 into route $R_2$ within this single shift to produce route $R_3$. Tasks $T_3$ and $T_4$ represent the insertion, noting that the single shift already covers $R_1$.

If $R_1$ and $R_3$ are to be legally covered by a new shift, a break at C must be allowed for. Tasks $T_3$ ($T_4$) represent the portion of route $R_3$ before (after) the break at C. Tasks $T_5$ and $T_6$ represent the insertion ignoring all previous routes covered by the single shift (in this case route $R_1$). If route $R_3$ is to be legally covered by a new shift on its own, then a break at E is allowed. Tasks $T_5$ ($T_6$) represent the portion of route $R_3$ before (after) the break at E. Finally, it is possible to use the three tasks $T_3$, $T_7$, $T_6$ (where $T_7$ is created by comparing the attributes of $T_3$ and $T_5$) to represent all possible shifts that could be generated using tasks $T_3$, $T_4$, $T_5$ and $T_6$.

Tasks representing only a portion of a route on one side of a break are fixed together meaning that these tasks appear consecutively in a single shift. In the example in FIG. 10, tasks $T_3$ and $T_7$ are fixed together as are tasks $T_7$ and $T_6$. This situation does not necessarily need to be the case. In these examples, the break may occur at a stop within a route where the vehicle may be not empty, driver exchanges of vehicles that are not empty, however, are usually not considered. The start (end) location of a task is either the start (end) location of the route or the location of the break activity explicitly inserted into the route when the task is constructed depending on which portion of the route the task represents.

For tasks representing an entire route and the portion of a route before a break, the allowable starting times may be determined by the traveling time between all the locations visited on the route and the delivery windows of all the shipments transported. For tasks representing the portion of a route after a break, the allowable starting times may be determined by the earliest starting and latest ending time of the break.

Thus, the different advantageous embodiments provide a computer implemented method, apparatus, and computer usable program code for generating a transportation plan containing vehicle routing, vehicle scheduling, and crew scheduling. In the different advantageous embodiments, a data set containing vehicle routing, vehicle scheduling, and crew scheduling information is identified. A subsequent integrated data set of vehicle routing, vehicle scheduling, and crew scheduling is iteratively generated by applying the policy to a prior data set of vehicle routing, vehicle scheduling, and crew scheduling.

These optimization processes are executed in these advantageous embodiments until some objective is met. In these examples, the objective may be a cost factor or some percentage of improvement in the cost factor or other suitable factor. Although specific vehicle route, vehicle schedule, and crew schedule generation techniques are described, the different advantageous embodiments may be applied using other vehicle route, vehicle schedule and crew schedule generation techniques in addition to or in place of the ones depicted in these examples. The different advantageous embodiments are directed towards generating the transportation plan, which vehicle routing, vehicle scheduling, and crew scheduling are simultaneously identified.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer assisted method for generating a transportation plan, the method comprising:
   identifying a set of transportation requests;
   creating an initial transportation plan having a set of vehicle routes, a set of vehicle schedules, and a set of crew schedules that satisfy the set of transportation requests; and
   simultaneously modifying on the computer the set of vehicle routes, the set of vehicle schedules, and the set of crew schedules repeatedly using a policy to generate a new transportation plan until an objective is met, in which specific pairs of items are transported with a given pick-up and drop-off sequence within a shift for a crew schedule in the set of crew schedules, and wherein simultaneously modifying further comprises:
   determining whether the set of vehicle routes, the set of vehicle schedules, and the set of crew schedules meet a threshold for an objective for the transportation plan;
   responsive to a determination that the threshold is unmet, determining whether any simplifying feature is still present in a dynamic programming algorithm;
   responsive to removing a simplifying feature from the dynamic programming algorithm after a determination that the threshold is unmet, determining whether all simplifying features of the dynamic programming algorithm have been removed;
   responsive to a determination that the all simplifying features have not been removed, sequentially performing random greedy enumeration, performing breadth first best only enumeration, calling the dynamic programming algorithm, performing explicit vehicle substitution, and performing least cost insertion on the set of vehicle routes, the set of vehicle schedules, and the set of crew schedules;
   responsive to a determination that the all simplifying features have been removed, sequentially calling the dynamic programming algorithm, performing the explicit vehicle substitution, and performing the least cost insertion on the set of vehicle routes, the set of vehicle schedules, and the set of crew schedules to form the new transportation plan;
   solving a linear program problem for the new transportation plan using the set of vehicle routes, the set of vehicle schedules, and the set of crew schedules; and
   repeating the step of determining whether the set of vehicle routes, the set of vehicle schedules, and the set of crew schedules meet the threshold for the objective for the transportation plan, the new transportation plan resulting from solving the linear programming problem for the new transportation plan.

2. The method of claim 1 further comprising:
   pruning the set of vehicle routes, the set of vehicle schedules, and the set of crew schedules in the new transportation plan based on an identified reduced cost.

3. The method of claim 1 further comprising:
   modifying the set of vehicle routes, the set of vehicle schedules, and the set of crew schedules to minimize a number of vehicles used.

4. The method of claim 1, wherein the simultaneously modifying step comprises:
   simultaneously modifying the set of vehicle routes, the set of vehicle schedules, and the set of crew schedules repeatedly using the policy to generate the new transportation plan until the objective is met for a set of vehicle types selected from at least one of trucks, trains, aircraft, and ships.

5. The method of claim 1, wherein the simultaneously modifying step further comprises:
   responsive to a determination that the threshold is met, determining whether all of the simplifying features of the dynamic programming algorithm have been removed;
   responsive to a determination that all of the simplifying features of the dynamic programming algorithm have been removed, performing shipment sequence fixing;
   determining whether a suitable fix is found by performing the shipment sequence fixing;
   responsive to a determination that the suitable fix is found, solving a linear integer mathematical formulation for a planning problem to form the transportation plan;
   responsive to a determination that the suitable fix is absent, determining whether the any simplifying features are still present in the dynamic programming algorithm;
   responsive to a determination that the any simplifying features are present in the dynamic programming algorithm; repeating the step of sequentially performing the random greedy enumeration, performing the breadth first best only enumeration, calling the dynamic programming algorithm, performing the explicit vehicle substitution, and performing the least cost insertion on the vehicle routes, the set of vehicle schedules, and the set of crew schedules; and
   responsive to a determination that the any the simplifying features are absent in the dynamic programming algorithm, repeating the step of sequentially calling the dynamic programming algorithm, performing the explicit vehicle substitution, and performing the least cost insertion on the set of vehicle routes, the set of vehicle schedules, and the set of crew schedules.

6. The method of claim 1, further comprising:
determining whether the set of vehicle routes, the set of vehicle schedules, and the set of crew schedules meet a threshold for an objective for the transportation;
determining whether any simplifying feature is still present in a dynamic programming algorithm in response to a determination that the threshold is unmet; and
determining whether all simplifying features of the dynamic programming algorithm have been removed in response to removing a simplifying feature from the dynamic programming algorithm after a determination that the threshold is unmet.

7. The method of claim 6, further comprising:
sequentially performing random greedy enumeration, perform breadth first best only enumeration, call the dynamic programming algorithm, perform explicit vehicle substitution, and perform least cost insertion on the set of vehicle routes, the set of vehicle schedules, and the set of crew schedules in response to a determination that the all simplifying features have not been removed; and
sequentially calling the dynamic programming algorithm, perform the explicit vehicle substitution, and perform the least cost insertion on the set of vehicle routes, the set of vehicle schedules, and the set of crew schedules to form the new transportation plan in response to determination that all simplifying features have been removed.

8. The method of claim 7, further comprising:
solving a linear program problem for the new transportation plan using the set of vehicle routes, the set of vehicle schedules, and the set of crew schedules; and
repeating the execution of the computer usable program code to determine whether the set of vehicle routes, the set of vehicle schedules, and the set of crew schedules meet the threshold for the objective for the transportation plan, the new transportation plan resulting from solving the linear programming problem for the new transportation plan.

9. A computer implemented method for creating a transportation plan, the computer implemented method comprising:
identifying data relating to vehicle routing, vehicle scheduling, and crew scheduling to form input data; and
simultaneously identifying a set of vehicle routes, a set of vehicle schedules, and a set of crew schedules using the input data, the set of vehicle schedules corresponding to at least a first vehicle and a second vehicle, the first vehicle and the second vehicle being different vehicle types, wherein the simultaneously identifying step comprises:
identifying an initial transportation plan comprising the set of vehicle routes, the set of vehicle schedules, and the set of crew schedules;
changing values in the initial transportation plan to optimize an objective to form a subsequent transportation plan; and
iteratively changing prior values in the initial transportation plan to optimize the objective to form the subsequent transportation plan until a threshold is reached for the objective to form the transportation plan, wherein iteratively changing prior values further comprises:
determining whether the set of vehicle routes, the set of vehicle schedules, and the set of crew schedules meet the threshold for an objective for the transportation plan;
responsive to a determination that the threshold is unmet, determining whether any simplifying feature is still present in a dynamic programming algorithm;
responsive to removing a simplifying feature from the dynamic programming algorithm after a determination that the threshold is unmet, determining whether all simplifying features of the dynamic programming algorithm have been removed;
responsive to a determination that the all simplifying features have not been removed, sequentially performing random greedy enumeration, performing breadth first best only enumeration, calling the dynamic programming algorithm, performing explicit vehicle substitution, and performing least cost insertion on the set of vehicle routes, the set of vehicle schedules, and the set of crew schedules;
responsive to a determination that the all simplifying features have been removed, sequentially calling the dynamic programming algorithm, performing the explicit vehicle substitution, and performing the least cost insertion on the set of vehicle routes, the set of vehicle schedules, and the set of crew schedules to form the new transportation plan;
solving a linear program problem for the new transportation plan using the set of vehicle routes, the set of vehicle schedules, and the set of crew schedules; and
repeating the step of determining whether the set of vehicle routes, the set of vehicle schedules, and the set of crew schedules meet the threshold for the objective for the transportation plan, the new transportation plan resulting from solving the linear programming problem for the new transportation plan.

10. A data processing system comprising:
a bus;
a communications unit connected to the bus;
a storage device connected to the bus, wherein the storage device includes computer usable program code; and
a processor unit connected to the bus, wherein the processor unit executes the computer usable program code to identify a set of transportation requests; create an initial transportation plan having a set of vehicle routes, a set of vehicle schedules, and a set of crew schedules that satisfy the set of transportation requests, and simultaneously modify the set of vehicle routes, the set of vehicle schedules, and the set of crew schedules repeatedly using a policy to generate a new transportation plan until an objective is met, in which specific pairs of items are transported with a given pick-up and drop-off sequence within a shift for a crew schedule in the set of crew schedules, wherein in executing the computer usable program code to simultaneously modify the set of vehicle routes, the set of vehicle schedules, and the set of crew schedules repeatedly using the policy to generate the new transportation plan until the objective is met, the processor unit executes the computer usable program code to determine whether the set of vehicle routes, the set of vehicle schedules, and the set of crew schedules meet a threshold for an objective for the transportation; determine whether any simplifying feature is still present in a dynamic programming algorithm in response to a determination that the threshold is unmet; determine whether all simplifying features of the dynamic programming algorithm have been removed in response to removing a simplifying feature from the dynamic programming algorithm after a determination that the threshold is unmet; sequentially perform random greedy enumeration, perform breadth first best only enumeration, call the dynamic programming algorithm, perform explicit vehicle substitution, and perform least cost insertion on the set of vehicle routes, the set of vehicle schedules, and the set of crew schedules in response to a determination that the all simplifying features have not been removed; sequentially call the dynamic programming algorithm, perform the explicit vehicle substitution, and perform the least cost insertion on the set of vehicle routes, the set of vehicle schedules, and the set of crew schedules to form the new transportation plan in response to determination that all simplifying features have been removed; solve a linear program problem for the new transportation plan using the set of vehicle routes, the set of vehicle schedules, and the set of crew schedules; and repeat the execution of the computer usable program code to determine whether the set of vehicle routes, the set of vehicle schedules, and the set of crew schedules meet the threshold for the objective for the transportation plan, the new transportation plan resulting from solving the linear programming problem for the new transportation plan.

11. The data processing system of claim 10, wherein the processor unit further executes the computer usable program code to prune the set of vehicle routes, the set of vehicle schedules, and the set of crew schedules in the new transportation plan based on an identified reduced cost.

12. The data processing system of claim 10, wherein the processor unit further executes the computer usable program code to modify the set of vehicle routes, the set of vehicle schedules, and the set of crew schedules to minimize a number of vehicles used.

13. The data processing system of claim 10, wherein in executing the computer usable program code to simultaneously modify the set of vehicle routes, the set of vehicle schedules, and the set of crew schedules repeatedly using the policy to generate the new transportation plan until the objective is met, the processor unit executes the computer usable program code to simultaneously modify the set of vehicle routes, the set of vehicle schedules, and the set of crew schedules repeatedly using the policy to generate the new transportation plan until the objective is met for a set of vehicle types selected from at least one of trucks, trains, aircraft, and ships.

14. The data processing system of claim 10, wherein in executing the computer usable program code to simultaneously modify the set of vehicle routes, the set of vehicle schedules, and the set of crew schedules repeatedly using the policy to generate the new transportation plan until the objective is met, wherein the processor unit further executes the computer usable program code to determine whether all of the simplifying features of the dynamic programming algorithm have been removed in response to a determination that the threshold is met; performing shipment sequence fixing in response to a determination that all of the simplifying features of the dynamic programming algorithm have been removed; determine whether a suitable fix is found by performing the shipment sequence fixing; solve a linear integer mathematical formulation for a planning problem to form the transportation plan in response to a determination that the suitable fix is found; determine whether the any simplifying features are still present in the dynamic programming algorithm in response to a determination that the suitable fix is absent; responsive to a determination that the any simplifying features are present in the dynamic programming algorithm, repeat the execution of the computer usable program code to sequentially perform the random greedy enumeration, perform the breadth first best only enumeration, call the dynamic programming algorithm, perform the explicit vehicle substitution, and perform the least cost insertion on the set of vehicle routes, the set of vehicle schedules, and the set of crew schedules in response to a determination that the any simplifying features are present; repeat execution of the computer usable program code to sequentially call the step of sequentially performing the random greedy enumeration; and responsive to a determination that any the simplifying features are absent in the dynamic programming algorithm, perform the explicit vehicle substitution, perform the explicit vehicle substitution, and perform the least cost insertion on the set of vehicle routes, the set of vehicle schedules, and the set of crew schedules in response to a determination that the any simplifying features are absent in the dynamic programming algorithm.

15. A computer program product for generating a transportation plan, the computer program product comprising:
a non-transitory computer readable medium;
program code, stored on the computer readable medium, for identifying a set of transportation requests;
program code, stored on the computer readable medium, for creating an initial transportation plan having a set of vehicle routes, a set of vehicle schedules, and a set of crew schedules that satisfy the set of transportation requests, the set of vehicle schedules corresponding to at least a first vehicle and a second vehicle, the first vehicle and the second vehicle being different vehicle types; and
program code, stored on the computer readable medium, for simultaneously modifying the set of vehicle routes, the set of vehicle schedules, and the set of crew schedules repeatedly using a policy to generate a new transportation plan until an objective is met, in which specific pairs of items are transported with a given pick-up and drop-off sequence within a shift for a crew schedule in the set of crew schedules and in which a crew member changes between a first vehicle and a second vehicle during a shift for the crew member, wherein the first vehicle is of a different type from the second vehicle, and wherein simultaneously modifying further comprises:
determining whether the set of vehicle routes, the set of vehicle schedules, and the set of crew schedules meet a threshold for an objective for the transportation plan;
responsive to a determination that the threshold is unmet, determining whether any simplifying feature is still present in a dynamic programming algorithm;
responsive to removing a simplifying feature from the dynamic programming algorithm after a determination that the threshold is unmet, determining whether all simplifying features of the dynamic programming algorithm have been removed;
responsive to a determination that the all simplifying features have not been removed, sequentially performing random greedy enumeration, performing breadth first best only enumeration, calling the dynamic programming algorithm, performing explicit vehicle substitution, and performing least cost insertion on the set of vehicle routes, the set of vehicle schedules, and the set of crew schedules;
responsive to a determination that the all simplifying features have been removed, sequentially calling the dynamic programming algorithm, performing the explicit vehicle substitution, and performing the least cost insertion on the set of vehicle routes, the set of vehicle schedules, and the set of crew schedules to form the new transportation plan;

solving a linear program problem for the new transportation plan using the set of vehicle routes, the set of vehicle schedules, and the set of crew schedules; and repeating the step of determining whether the set of vehicle routes, the set of vehicle schedules, and the set of crew schedules meet the threshold for the objective for the transportation plan, the new transportation plan resulting from solving the linear programming problem for the new transportation plan.

16. The computer program product of claim 15, wherein the program code, stored on the computer readable medium, for simultaneously modifying the set of vehicle routes, the set of vehicle schedules, and the set of crew schedules repeatedly using the policy to generate the new transportation plan until the objective is met comprises:

program code, stored on the computer readable medium, for simultaneously modifying the set of vehicle routes, the set of vehicle schedules, and the set of crew schedules repeatedly using the policy to generate the new transportation plan until the objective is met in which a crew member changes between a first vehicle and a second vehicle during a shift for the crew member, wherein the first vehicle is of a different type from the second vehicle.

17. A data processing system comprising:

a bus;

a communications unit connected to the bus;

a storage device connected to the bus, wherein the storage device includes program code; and a processor unit connected to the bus, wherein the processor unit executes the program code to identify data relating to vehicle routing, vehicle scheduling, and crew scheduling to form input data; and simultaneously identify a set of vehicle routes, a set of vehicle schedules, and a set of crew schedules using the input data, the set of vehicle schedules corresponding to at least a first vehicle and a second vehicle, the first vehicle and the second vehicle being different vehicle types, using a policy to generate a new transportation plan until an objective is met, in which specific pairs of items are transported with a given pick-up and drop-off sequence within a shift for a crew schedule in the set of crew schedules and in which a crew member changes between a first vehicle and a second vehicle during a shift for the crew member, wherein the first vehicle is of a different type from the second vehicle, and wherein the processor unit further executes the processor code to:

determine whether the set of vehicle routes, the set of vehicle schedules, and the set of crew schedules meet a threshold for an objective for the transportation plan;

responsive to a determination that the threshold is unmet, determine whether any simplifying feature is still present in a dynamic programming algorithm;

responsive to removing a simplifying feature from the dynamic programming algorithm after a determination that the threshold is unmet, determine whether all simplifying features of the dynamic programming algorithm have been removed;

responsive to a determination that the all simplifying features have not been removed, sequentially perform random greedy enumeration, perform breadth first best only enumeration, call the dynamic programming algorithm, perform explicit vehicle substitution, and perform least cost insertion on the set of vehicle routes, the set of vehicle schedules, and the set of crew schedules;

responsive to a determination that the all simplifying features have been removed, sequentially call the dynamic programming algorithm, perform the explicit vehicle substitution, and perform the least cost insertion on the set of vehicle routes, the set of vehicle schedules, and the set of crew schedules to form the new transportation plan;

solve a linear program problem for the new transportation plan using the set of vehicle routes, the set of vehicle schedules, and the set of crew schedules; and repeat the step of determining whether the set of vehicle routes, the set of vehicle schedules, and the set of crew schedules meet the threshold for the objective for the transportation plan, the new transportation plan resulting from solving the linear programming problem for the new transportation plan.

* * * * *